June 4, 1940.　　　V. MULHOLLAND　　　2,203,269
METHOD OF AND APPARATUS FOR MAKING GLASS
Filed Feb. 14, 1938
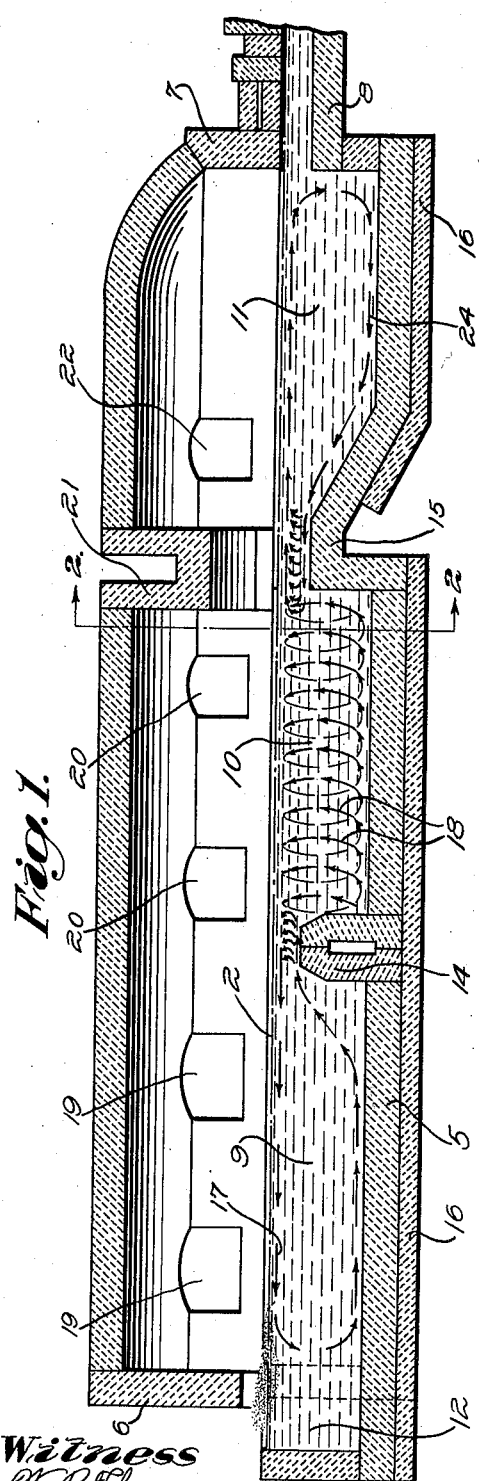
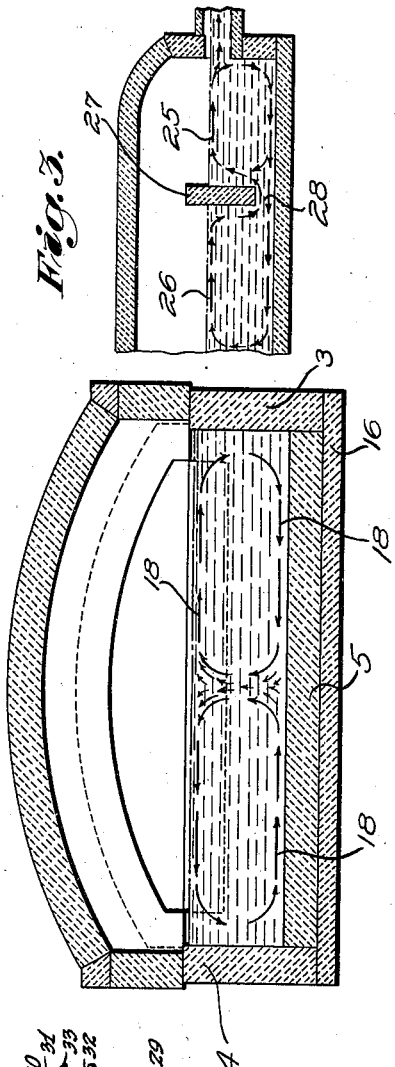
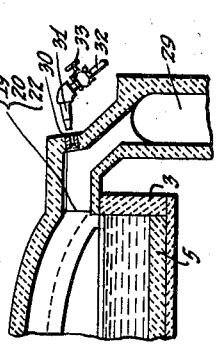
Inventor
Vergil Mulholland
by Brown + Parham
Attorneys
Witness
W. B. Thayer

Patented June 4, 1940

2,203,269

UNITED STATES PATENT OFFICE 2,203,269

METHOD OF AND APPARATUS FOR MAKING GLASS

Vergil Mulholland, West Hartford, Conn., assignor to Hartford-Empire Company, Hartford, Conn., a corporation of Delaware Application February 14, 1938, Serial No. 190,434

7 Claims. (Cl. 49—54)

This invention relates to method of and apparatus for making glass in tank furnaces. It is related to and in certain aspects comprises an improvement upon the invention of my prior Patent No. 2,068,925.

As in my prior patent, the general purpose of the present invention is to provide a glass melting furnace and a method of glass making which will permit the making of clear, homogeneous glass at high furnace ratings with a minimum fuel expenditure and with certainty of continuous controlled operation at the varying rates of pull demanded by varying conditions of glassware manufacture. By the use of the present invention with that of said prior patent, this purpose is more completely realized. It is to be understood, however, that the present invention is not necessarily limited in use to furnaces of my prior patent, but is applicable to other furnaces.

More particularly an object of the present invention is to provide a continuous glass melting furnace in which the stages of glass melting and refining the glass by ebullition, and of cooling the glass to absorb gases remaining therein, are carried out in separate portions of the furnace, their separation being effected in part by means of a weir extending upwardly from the bottom of the furnace and from side to side thereof, and in part by application of suitable thermal control in the different portions of the furnace.

The provisions are such as to permit the maintenance in the portions of the furnace assigned to the several stages of convection circulations which are distinct one from the other, and such that return of glass in the cooling stage to the refining circulation, and its contamination by glass in an earlier stage of treatment is eliminated or greatly reduced.

A further object of my invention is to provide a furnace in which separate stages of glass making are carried out, as aforesaid, and in which there is free communication between the portions of the glass in the several portions of the furnace in upper strata thereof.

In the accompanying drawing,

Figure 1 is a longitudinal vertical section through a furnace embodying the present invention;

Fig. 2 is a vertical lateral section taken on the line 2—2 of Fig. 1;

Fig. 3 is a diagram indicating the circulatory movement of glass in a conventional furnace of the prior art, which employs a bridge wall with a submerged throat; and Fig. 4 is a fragmentary view substantially in vertical transverse section showing the manner of applying heat to the furnace of the previous figures.

In prior furnaces employed for the manufacture of glass for bottles and similar containers, it has been customary to provide a bridge wall having therein a submerged throat between the refining chamber or the melting and refining chamber on the one hand and the work-out or cooling chamber on the other. Communication between these chambers is effected in the lower stratum of the glass and is prevented in the upper stratum. This condition is illustrated in Fig. 3, wherein the refining chamber (left) and the work-out chamber (right) are shown as separated by a conventional bridge wall 27 and communicate through a submerged throat 28. In such furnaces there usually exists a circulation in the melting and refining zones, indicated by arrows 26, moving in the upper stratum of the glass from a hot spot somewhat distant from the bridge wall, toward the bridge wall, then downwardly along the bridge wall and returning in a lower stratum to beneath the hot spot, a portion of such glass being diverted and carried into the work-out chamber by the pull on the furnace and by the circulation in the work-out chamber, indicated by arrows 25. This diverted glass rises promptly after passing through the throat in a relatively hot zone in the rearward portion of the work-out chamber, thence moves in an upper portion of the bath toward the cooler forward and side walls, thence down these walls and returns toward, and to a considerable extent through the throat 28. That portion of the glass which again enters the refining and/or melting circulation becomes contaminated by the unfinished glass in that circulation. This reduces the efficiency of the furnace because the heat in the refining zone must be repeatedly expended upon the glass which returns to the refining circulation.

The present invention removes or greatly reduces this cause of inefficiency and provides a materially better separation between the circulation of the cooling glass and the glass in the process of refining. This is made possible by mechanical separation of the lower portions of the chambers, as by a weir extending from side to side and rising a substantial distance from the bottom of the furnace, providing communication between the refining and cooling chambers only in the upper stratum of the glass bath. It is contemplated that the heat distribution will be such that the hotter zone of the cooling chamber is maintained approximately over the weir, and that there will be little if any temperature difference between the glass of the upper stratum immediately adjacent to the two sides of the weir. By reason of the substantial reduction of the depth of the glass over the weir, the temperature difference between its upper and lower strata is reduced. This greatly reduces the rate at which the glass moves over the weir. As there is a substantial temperature difference between the glass over the weir and the forward end wall of the cooling chamber, and only a slight, if any, difference between it and the adjacent surface glass in the refining zone, most, if not all, of the glass returning in the cooling circulation moves again in that circulation, and little if any returns to the refining chamber. Thus, a more effective separation of the circulation of the refining glass and the cooling glass may be maintained than in the usual furnace.

In order effectively to take advantage of the construction provided, suitable separately regulable heating and heat control means are provided for properly distributing the heat of the furnace to the several portions of the glass.

Referring to Figs. 1 and 2 of the drawing, the tank is shown as containing a bath of molten glass which is maintained up to a predetermined normal level 2. The container for the bath includes side walls 3 and 4, a bottom generally indicated at 5 and an end wall 6 at the end of the tank at which the glass-making materials are supplied, and an end wall 7 at the glass delivery end. Glass may be removed from the furnace through a forehearth generally indicated at 8.

The furnace may be considered as divided into three zones, including a melting zone 9, a refining zone 10 and a cooling or absorption zone 11, provision being made for the flow in an upper stratum of the glass between these zones. Glass-making material or batch is supplied to the melting end of the furnace at one or more doghouses 12 by any suitable means. Preferably the doghouses 12 are arranged symmetrically across the charging end of the tank in such a manner that the glass-making materials or batch may be uniformly distributed across such end. It is contemplated in this connection that any suitable type of means (not shown) may be provided, preferably automatic in character and substantially continuous in operation, for supplying glass-making materials or batch to the furnace.

The glass in the melting zone 9 of the furnace is partially separated from that in other portions of the furnace by a weir 14 which may be formed of one or more blocks built up from or forming a bottom of the furnace, and supported in any desired manner so as to preclude flow of glass from the melting zone to the refining zone 10, except in the upper stratum of the bath. The weir 14 extends uniformly from side to side of the furnace. Similarly the glass in the refining chamber 10 is partially separated from that in the cooling and absorption chamber 11 by a weir 15 so as to preclude the flow of glass from the refining zone 10 to the cooling zone 11, except in an upper stratum of the bath. The weir 15 also extends from side to side of the furnace and is preferably formed with a sloping surface on the cooling chamber side.

The bottom of the furnace and certain of its side walls may be insulated as indicated at 16. As disclosed in my aforementioned prior patent, the side walls of the refining chamber 10 are preferably of relatively high heat conductivity to aid in creating convection currents transversely of the refining chamber. The circulation in the refining zone may take the form generally of two parallel helixes, as indicated by the arrows 18, resulting from the generally transverse convection movement combined with the forward movement of the glass resulting from the pull on the furnace. Also as set forth in my prior patent, the distribution of heat and/or the relative conductivity of the side and end walls of the melting compartment may be such as to create a substantial orbital circulation of the melting glass and glass batch in which the upper stratum of glass moves rearwardly as indicated by the arrows 17.

For supplying heat to the melting zone 9 there are provided suitable burner and regenerator ports indicated generally at 19. Similar ports 20 are provided for supplying heat to and controlling the temperature in the refining chamber 10. Preferably the firing in the several compartments is independently controllable, and is preferably so controlled as to create a hot zone over or just in advance of the weir 14 extending transversely of the furnace and a hot zone near the longitudinal center line of the refining compartment. There is shown in Fig. 4 a conventional manner of applying heat to the furnace of the previous figures which is regulable, as above set forth, to carry out the method herein described. As shown in this figure, the port numbered 19, 20 and 22 is intended to indicate any one of the ports 19, 20 or 22, Fig. 1. This port communicates in the usual manner with a regenerator chamber 29 for air. Associated with the port is a perforated burner block 30 with which is associated a suitable burner 31 to which fluid fuel is directed through a pipe 32. The flow of fuel to the burner and hence the intensity of the heat generated by this fuel, as well as the disposition of the heat, may be regulated by a conventional valve, here shown as a hand operated valve 33. It is to be understood that the burners associated with the several ports are regulated in accordance with the teachings found elsewhere in this application.

With respect to the physical arrangements and method of operation of the melting and refining chambers heretofore described, the present furnace may be substantially similar to that heretofore set forth in my aforesaid prior patent.

The cooling and absorption chamber may be partially separated from the other portions of the furnace above the glass level, as by shadow wall 21. A separate heating means 22 may be provided toward the rear of the chamber 11.

As is apparent the communication in the lower stratum of the glass commonly present between the refining and work-out zones of the old furnaces is absent from the furnace of my present invention. The glass, the refining of which has been completed in the chamber 10, may pass to the cooling chamber only over the weir 15; and its return to the refining chamber is prevented or materially reduced by the combined action of the weir and the maintenance of proper distribution of the heat. The movement of the glass from the refining chamber to the cooling chamber is at a rate approximately equal to the rate of withdrawal of the glass through the forehearth or forehearths 8. The heat distribution in the furnace is preferably such that a relatively hot zone in the glass exists immediately or approximately over the weir 15. This sets up a substantially orbital circulation of the glass in the cooling chamber moving in the upper stratum of the glass forwardly toward the forehearth 8. Some of the glass is diverted to the forehearth. The remainder moves downwardly along the relatively cold forward wall, and returns in the lower stratum which moves upwardly along the sloping side of the weir 15 as it returns to the relatively hot zone, as indicated by arrows 24. Preferably slight, if any, temperature difference is permitted to exist between the glass on the two sides of and adjacent to the weir. Thus the return of glass from the cooling zone to the refining circulation, commonly present in the prior furnaces, is eliminated or greatly reduced, and the furnace efficiency increased.

It is obvious that by the reduction or substantial elimination of this return of the glass, as accomplished in the present invention, it is possible for the first time to fire and control the distribution of heat in each of the several zones in a manner better suited for the particular operation for which that zone is intended. The compromises which have been necessary in prior furnaces, because of the return of a substantial amount of the glass from the forward portions are no longer necessary.

Such expressions as "distinct circulations" and "to prevent contamination" used herein or in the appended claims are not intended to imply that absolutely no glass may return from a later to an earlier circulation, but only that the separation of the circulations is maintained to a materially greater degree than in prior commercial furnaces, and that contamination of the more advanced glass by glass in an earlier stage of treatment is reduced so materially as appreciably to increase the efficiency of the furnace.

I am aware that various changes may be made both in my method as herein set forth and in the apparatus which I have illustrated and described, and I do not wish to be limited therefore in any respect other than by the appended claims which are to be construed as broadly as the state of the prior art permits.

I claim:

1. The method of making glass in a continuous tank furnace, which comprises the steps of establishing and maintaining a bath of molten glass in the furnace, of a general depth such that when heat is applied to the upper surface of the glass, substantial temperature differences exist between the upper and lower strata thereof, substantially separating adjacent portions of the bath below the surface thereof to form two pools adapted respectively for melting and refining on the one hand and for cooling and absorption of gases remaining in the glass on the other, said pools communicating freely at their surface while interchange of glass is prevented in the lower strata of said pools, supplying glass-making materials to the surface of the glass at the rear end of the melting and refining pool, supplying heat by combustion to the melting and refining pools to melt the glass-making materials and to refine the glass therein by establishing in the melting and refining pool a zone of high temperature at a position spaced from the side walls of the pool so as to cause an ebullition circulation to refine the glass, and establishing a zone of high temperature disposed transversely of the tank and substantially conforming to the division between the melting and refining pool on the one hand and the cooling and absorption pool on the other hand so as to maintain separate the circulations in said pools respectively, substantially to prevent return movement of finished glass from the cooling and absorption pool to the melting and refining pool and thus to prevent contamination of the cooling glass by the refining glass, and withdrawing glass from the cooling and absorption pool for use at a rate substantially equal to the rate of flow of glass from the melting and refining pool to the cooling and absorption pool.

2. The method of continuously making glass in a tank furnace which is divided below the normal level into a refining pool and a cooling and absorption pool communicating only in an upper portion of the bath, which comprises the steps of maintaining a bath of molten glass in the furnace up to the normal level, charging glass-making materials to the end of the refining pool distant from the cooling and absorption pool, applying heat to the molten glass in the refining pool to melt the glass-making materials supplied thereto and to refine the glass therein by establishing in this pool a zone of high temperature at a position spaced from the side walls of the pool so as to cause an ebullition circulation to refine the glass, and supplying additional heat to establish a zone of high temperature disposed transversely of the bath of glass above the division between the refining pool and the cooling and absorption pool so as to maintain substantially separate the circulations of glass in the pools on the opposite sides of said division, and withdrawing glass from the cooling and absorption pool for use at substantially the same rate that glass is formed by the melting of glass-making materials and at substantially the same rate that the glass flows from the refining pool to the cooling and absorption pool, whereby interchange of glass in excess of that required to compensate for the draw on the tank between the melting and refining pool on the one hand and the cooling and absorption pool on the other is substantially eliminated.

3. The method of continuously making glass in a furnace, which is divided below the normal surface of the glass into a melting compartment, a refining compartment and a cooling and absorption compartment by dam-type weirs extending transversely from side to side of the furnace, which comprises maintaining a bath of glass in said furnace comprising three pools separated below the normal glass level and communicating in their upper strata only, feeding batch into the end of the melting compartment distant from the first weir and withdrawing finished glass from the cooling and absorption compartment opposite the second weir, heating the glass in the melting compartment to melt the batch, and to establish a transversely disposed elongate hot zone adjacent to the first weir to create an orbital circulation in the melting compartment, moving rearwardly thereof in the upper stratum of the glass, heating the glass in the refining compartment to refine the glass by ebullition to remove a part of its gases and to create a longitudinally disposed elongate hot zone adjacent to the longitudinal center line of the compartment to create convection circulation principally transverse of the compartment and distinct from the melting circulation, supplying additional heat to create a transversely disposed elongate hot zone substantially over the weir separating the refining compartment from the cooling compartment to maintain substantially separate the circulations in the refining compartment and the cooling compartment, and withdrawing glass from the cooling compartment for use, whereby the flow of glass from the melting to the refining compartment and that from the refining compartment to the cooling compartment are both substantially equal to the rate of glass withdrawal from the tank and the glass in each compartment is maintained substantially free from contamination by interchange of glass between the several compartments in excess of that required by the pull on the tank.

4. A bridgeless glass melting furnace, comprising a basin adapted to hold a bath of molten glass up to a predetermined normal level, a weir extending upwardly from the bottom and from side to side of the basin partially separating the basin into a refining zone in which the glass is relatively highly heated to remove bubbles of gas therefrom and homogenize it by ebullition, and a cooling zone to which the glass is moved to effect absorption of gases remaining therein, the glass in said zones communicating only at an upper stratum of the bath, means for supplying glass-making materials to said basin and for delivering finished glass therefrom, heating means for said furnace, and means for controlling the heat supplied to said basin by said heating means to establish a zone of high temperature above said weir tending to create distinct convection circulations in the refining and cooling zones such that the return of cooling glass from the cooling zone to the refining circulation is materially reduced or prevented.

5. A glass melting furnace, comprising a basin formed by side walls, a rear end wall and a front wall adapted to hold a bath of molten glass up to a predetermined normal level, a pair of spaced weirs extending upwardly from the bottom of said basin and from side to side thereof and terminating below the normal level of the bath of glass in said basin, said basin being otherwise unobstructed at said normal level in the entire area bounded by said walls, said weirs dividing the basin into a melting compartment disposed between said rear end wall and the first of said weirs, a refining compartment disposed between said weirs and a cooling and absorption compartment of substantial area in respect to the area of said basin and disposed between the second of said weirs and said front wall, said compartments being adapted to contain pools of glass having communication only at an upper stratum thereof, means for feeding glass making materials to the rear end of the melting compartment distant from said first weir, means for delivering finished glass from the front end of the cooling and absorption compartment distant from said second weir, and separately controllable means for supplying heat to the glass in said compartments to create predetermined distinct convection circulations in said compartments respectively.

6. A glass melting furnace, comprising bottom and side walls, a rear end wall and a front end wall defining a glass-confining basin in which molten glass is adapted to be maintained up to a predetermined normal level, means for supplying glass-making materials to a bath of glass in said basin adjacent to the rear end wall thereof, a weir extending upwardly from the bottom of said basin and from side to side thereof and terminating below the normal level of the surface of glass in said basin, said weir being disposed at a substantial distance from said front end wall toward said rear end wall so as to separate said basin into a melting and refining compartment between said weir and the rear end of said basin and a cooling and homogenizing compartment of substantial size between said weir and the front end of said basin, said basin being otherwise unobstructed at said normal level in the area bounded by said walls, said weir having a top surface which is relatively small in its longitudinal extent as compared with its lateral extent, and being spaced from said front end wall a predetermined substantial distance so that the cooling and homogenizing compartment has a substantial area in respect to the total area of said basin, means for withdrawing finished glass from a portion of the cooling and homogenizing compartment adjacent to said front wall, means for supplying heat to the glass in said basin, and means to regulate the application of heat to the glass so as to provide a hot zone substantially above said weir tending to prevent interchange of glass between the compartments on the opposite sides of said weir in excess of that flowing incident to the withdrawal of finished glass from the tank.

7. A glass melting furnace in accordance with claim 6, wherein the heating means for the glass includes means disposed on both sides of and adjacent to said weir to establish a zone of high temperature substantially over said weir tending to prevent interchange of glass between the compartments on the opposite sides thereof in excess of that occasioned by the withdrawal of glass from the furnace.

VERGIL MULHOLLAND.